Patented Nov. 28, 1933

1,937,133

UNITED STATES PATENT OFFICE

1,937,133

THERAPEUTIC EXTRACT

Elwood A. Sharp, Detroit, and Cyrus C. Sturgis and Raphael Isaacs, Ann Arbor, Mich., assignors to The Regents of the University of Michigan, a corporation of Michigan No Drawing. Application April 28, 1930
Serial No. 448,168

7 Claims. (Cl. 167—74)

The invention relates to the preparation of a therapeutic product having anti-anæmic properties and is based upon our discovery that the stomach tissue of animals, particularly of hogs, contains an active principle having such properties. We have found that stomach extracts made in accordance with our invention contain a substance which actuates to a high and satisfactory degree the required erythropoiesis (stimulation of the growth of red blood cells) essential to the production of a remission in pernicious anæmia.

Our experiments indicate that the active principle is present to some degree in stomach mucosa when separated from the muscular and serous layers of the stomach wall. The muscular and connective tissue of the stomach wall is relatively weak and evidence is accumulating that both portions of the stomach, that is the mucosa containing the glandular tissue and the muscular layers, are required to obtain the most potent extracts.

The main feature of our invention resides in our discovery that we may obtain a concentrated product having improved taste and other physical characteristics without loss of potency by extracting the stomach substance with certain solvents such as petroleum ether. This material extracts the fat from the stomach without causing a loss of potency, whereas water soluble solvents such as acetone and alcohol are not satisfactory because they appreciably reduce the activity of the material.

We have prepared a product suitable for practical use in the treatment of pernicious anæmia. For oral use it is unnecessary that the product be water soluble and we have therefore provided a desiccated defatted substantially tasteless preparation made by the following method.

Fresh whole stomachs (preferably hog) are freed from extraneous tissue, minced finely, subjected to a high vacuum at a low temperature and thus thoroughly freed from water. The water-free product is ground finely and subjected to treatment with a fat solvent (preferably purified petroleum ether in a soxhlet apparatus). The fat-free product is spread on trays and subjected to circulating air until all traces of petroleum ether have been removed. The product is then powdered and subjected to clinical standardization. This product is a valuable therapeutic agent for oral administration.

While in the above description we have set forth a specific product embodying our invention and the process of obtaining the same, it is to be understood that the invention might be embodied in other products derived from stomach tissue and containing the anti-anæmic fraction in such amounts as to be useful in the treatment of pernicious anæmia.

What we claim as our invention is:

1. A therapeutic product comprising desiccated defatted stomach tissue containing an active principle having the physiological property of combating pernicious anæmia.

2. The process of preparing a therapeutic product useful for combating pernicious anæmia which consists in obtaining fresh whole stomachs substantially free from extraneous tissue, extracting water from the product at low temperatures and treating the desiccated product with a reagent capable of dissolving out the fat without dissolving or destroying the active principle thereby obtaining a product having an active principle useful for combating pernicious anæmia.

3. A therapeutic product comprising desiccated, defatted hog stomach, said product being a powdered solid adapted for oral administration and having the physiological property of actuating erythropoiesis and combating pernicious anæmia.

4. The process of preparing a therapeutic product useful for combating pernicious anæmia comprising the comminuting of fresh whole hog stomachs freed from extraneous fat, subjecting the comminuted material to high vacuum at temperatures sufficiently low to thereby remove water without destroying the active principle, subjecting the resulting desiccated product to the action of a fat solvent to remove the fat, treating the defatted product with circulating air until the fat solvent is entirely removed, and powdering the material thereby producing a product adapted for oral administration to humans and having the physiological property of actuating erythropoiesis.

5. The process of preparing a therapeutic product useful for combating pernicious anæmia comprising the comminuting of fresh whole hog stomachs freed from extraneous fat, subjecting the comminuted material to as high a vacuum as commercially obtainable while heating the material to a low temperature sufficient to remove water therefrom without destroying the active principle, subjecting the resulting desiccated product to the action of petroleum ether to remove the fat, treating the defatted product with circulating air until the petroleum ether is entirely removed, and powdering the material thereby producing a product adapted for oral administration to humans and having the physiological property of actuating erythropoiesis.

6. A product derived from the stomach tissue of animals, which product is in solid form, is somewhat soluble in alcohol and practically insoluble in petroleum ether and contains an active principle effective by oral administration in combating pernicious anæmia and actuating erythropoiesis.

7. A therapeutic product derived from stomach tissue of animals, said product being somewhat soluble in alcohol and practically insoluble in petroleum ether and containing an active principle effective in combating pernicious anæmia and actuating erythropoiesis.

ELWOOD A. SHARP.
CYRUS C. STURGIS.
RAPHAEL ISAACS.